United States Patent
Pasquero et al.

(10) Patent No.: US 8,309,013 B2
(45) Date of Patent: Nov. 13, 2012

(54) METHOD FOR THE PRODUCTION OF COMPONENTS MADE OF CERAMIC-MATRIX COMPOSITE MATERIAL

(75) Inventors: Giuseppe Pasquero, Turin (IT); Giovanni Paolo Zanon, Turin (IT); Maria Rita Petrachi, Turin (IT); Antonio Licciulli, Turin (IT); Antonio Chiechi, Turin (IT); Maurizio Fersini, Turin (IT)

(73) Assignee: Avio S.p.A., Turin (IT)

( * ) Notice: Subject to any disclaimer, the term of this patent is extended or adjusted under 35 U.S.C. 154(b) by 384 days.

(21) Appl. No.: 12/604,446

(22) Filed: Oct. 23, 2009

(65) Prior Publication Data
US 2010/0109209 A1    May 6, 2010

(30) Foreign Application Priority Data
Oct. 31, 2008    (EP) .................................. 08425701

(51) Int. Cl.
 *B28B 1/26*    (2006.01)
 *B28B 1/42*    (2006.01)
 *B28B 1/52*    (2006.01)
 *B28B 7/28*    (2006.01)
 *B28B 7/36*    (2006.01)

(52) U.S. Cl. ........ 264/637; 264/621; 264/635; 264/640; 264/643; 264/681

(58) Field of Classification Search .................. 264/621, 264/635, 637, 640, 641, 642, 643, 651, 681, 264/682, 683
See application file for complete search history.

(56) References Cited

U.S. PATENT DOCUMENTS

| | | | | |
|---|---|---|---|---|
| 2,030,200 | A * | 2/1936 | Gallup | 501/127 |
| 5,053,364 | A * | 10/1991 | Ray | 501/95.2 |
| 5,221,578 | A * | 6/1993 | Carpenter et al. | 428/367 |
| 5,436,042 | A | 7/1995 | Lau et al. | |
| 5,498,383 | A * | 3/1996 | Marple et al. | 264/87 |
| 5,856,252 | A | 1/1999 | Lange et al. | |
| 6,251,317 | B1 * | 6/2001 | Lundberg et al. | 264/44 |

(Continued)

FOREIGN PATENT DOCUMENTS
EP    0 434 501    6/1991
(Continued)

OTHER PUBLICATIONS

Levi, C. G., et al "Processing and Performance of an All-Oxide Ceramic Composite." *Journal of the American Ceramic Society* (1998) vol. 81, No. 8, pp. 2077-2086.

*Primary Examiner* — Joseph Del Sole
*Assistant Examiner* — Ryan Ochylski
(74) *Attorney, Agent, or Firm* — Ladas & Parry LLP.

(57) ABSTRACT

A method for the production of components made of ceramic-matrix composite material, in the fields of aerospace engines and turbines and turbine systems and plants; according to the method, a preform of ceramic fibers is shaped and set in a draining mold, for example made of plaster; the fibers of the preform are impregnated with a suspension of ceramic powders, the liquid of which is drained by capillarity from the draining mold; simultaneously to draining, a suspension of ceramic powders is infiltrated between the fibers of the preform so as to fill the empty space left by the drained liquid; at the end of the steps of draining/infiltration a body is obtained with a solidified or compacted porous matrix, which is removed from the draining mold and is sintered.

28 Claims, 3 Drawing Sheets

U.S. PATENT DOCUMENTS

| | | | |
|---|---|---|---|
| 7,100,400 B2 * | 9/2006 | Bhandarkar et al. | 65/395 |
| 2002/0088599 A1 * | 7/2002 | Davis et al. | 164/97 |
| 2003/0080477 A1 * | 5/2003 | Merrill et al. | 264/637 |
| 2005/0281945 A1 * | 12/2005 | Matsumoto et al. | 427/180 |
| 2006/0280940 A1 * | 12/2006 | Kanka | 428/364 |
| 2009/0014926 A1 * | 1/2009 | Marini | 264/635 |

FOREIGN PATENT DOCUMENTS

| | | | |
|---|---|---|---|
| GB | 2266681 A | * | 11/1993 |
| JP | 61202799 A | * | 9/1986 |
| JP | 03038303 A | * | 2/1991 |
| WO | 92/00182 | | 1/1992 |
| WO | 93/22258 | | 11/1993 |

* cited by examiner

METHOD FOR THE PRODUCTION OF COMPONENTS MADE OF CERAMIC-MATRIX COMPOSITE MATERIAL

The present invention relates to a method for the production of components made of ceramic-matrix composite material. The method is to be used in the following fields:
 production of components for aerospace engines; and
 production of turbine components and components of turbine systems and plants (for example, of the so-called "aero-derivative" type and for the production of electrical energy).

BACKGROUND OF THE INVENTION

As is known, components made of ceramic material of a monolithic type, for example, made of silicon carbide or silicon nitride, have a high mechanical resistance and good resistance to thermal fatigue, but are relatively brittle and do not tolerate sharp thermal gradients. To overcome said drawback, in the last few years the trend has been to produce composite materials having a ceramic matrix and reinforcements made of ceramic fibres. In this type of materials, it is advantageous to coat the surface of the fibres with a material that is heterogeneous both with respect to the matrix and with respect to the fibres so as to increase the toughness by means of the mechanism of deflection of propagation of the crack from perpendicular to parallel with respect to the surface of interface between the matrix and the fibres, at the same time guaranteeing an adequate transfer of the loads.

In addition, there has been asserted the trend to use ceramic oxides in so far as non-oxide materials do not present a good resistance to oxidation at high temperatures (for example, temperatures of approximately 1250° C.) and are subject to creep phenomena and phenomena of corrosion due to aggressive environments.

Unfortunately, the known production processes for making composite materials with a ceramic matrix and a base of ceramic oxides entail long times and high costs.

The U.S. patent application No. US 2006-0280940 A1 describes a production method that should enable reduction of the production times and, simultaneously, obtaining components with satisfactory mechanical characteristics. Such production process comprises the steps of: preparing a suspension of fluid and pourable ceramic powders; impregnating continuous fibres made of ceramic oxide using said suspension; using the impregnated fibres for forming a body made of non-sintered composite material, referred to as "green body"; eliminating the water from the green body via drying; and finally sintering the green body.

However, also this production process proves unsatisfactory in so far as the obtained composites have very high values of porosity (comprised between 45% and 75%).

SUMMARY OF THE INVENTION

The aim of the present invention is to provide, in the fields referred to above, a method for the production of components made of ceramic-matrix composite material, which will enable a simple and economically advantageous solution to the problems set forth above.

Provided according to the present invention is a method for the production of components made of ceramic-matrix composite material, as claimed in the attached claims, to be used in the fields referred to above.

BRIEF DESCRIPTION OF THE DRAWINGS

For a better understanding of the present invention, a preferred embodiment is now described, purely by way of non-limiting example, with reference to the annexed drawings, wherein.

DETAILED DESCRIPTION OF THE INVENTION

Figure 1:
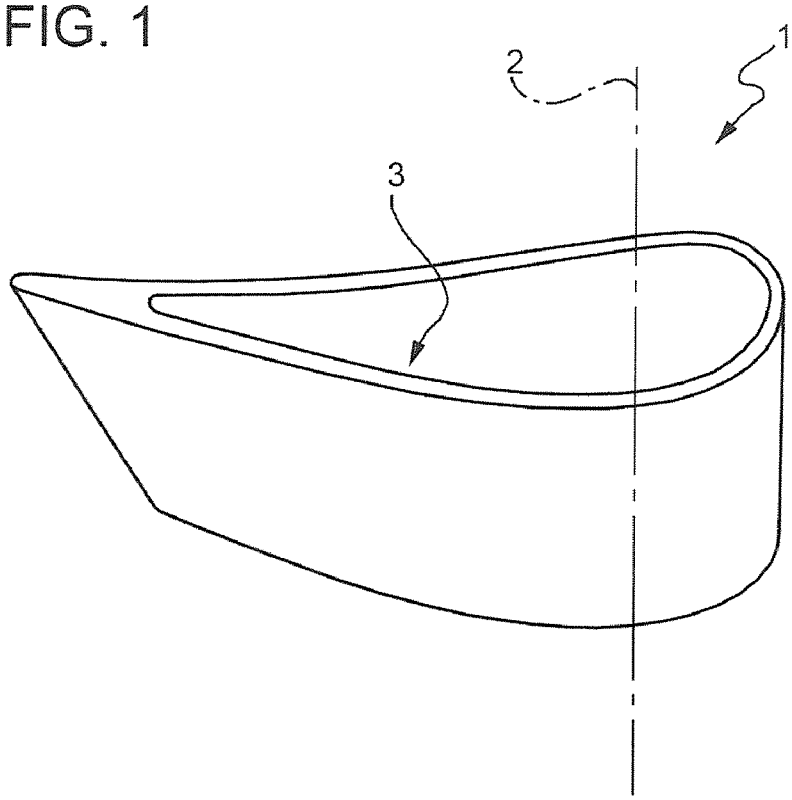
FIG. 1 shows a turbine component, made of ceramic-matrix composite material according to a preferred embodiment of the method of the present invention.

Designated by 1 in FIG. 1 is a stator blade for a turbine plant, in particular for aeronautical applications. The blade 1 extends along an axis 2 and is defined by an annular wall, which has an axial cavity 3, and is made of a composite material entirely consisting of ceramic oxides.

In particular, the composite material comprises a matrix made of alumina ($Al_2O_3$) and a reinforcement phase defined by fibres of alumina-based ceramic oxide provided with a coating of zirconia ($ZrO_2$). Said coating has the function of interface for decoupling the fibres from the matrix and hence improving the toughness of the composite material, and, preferably, has a thickness of approximately 1 µm.

Figure 2:
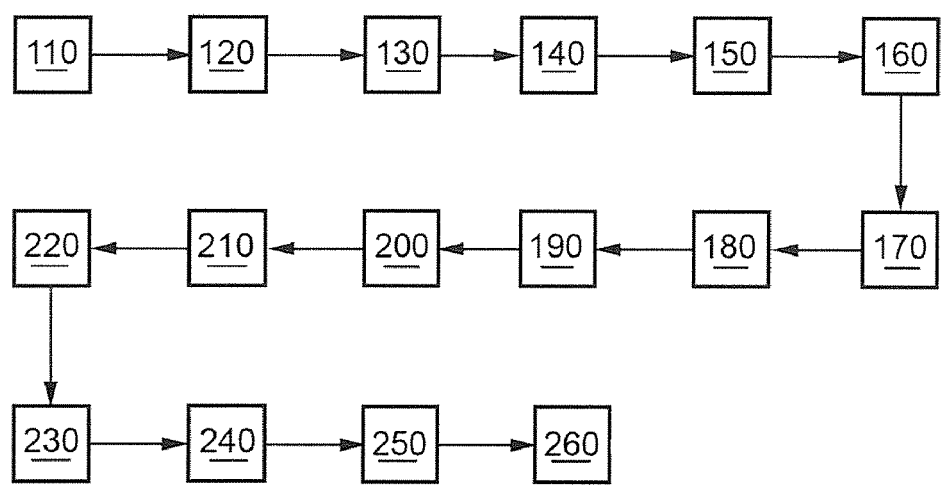
FIG. 2 is a block diagram that shows the steps of a preferred embodiment of the method for production of components made of ceramic-matrix composite material according to the present invention.

The blade 1 is obtained via a process, the steps of which are represented schematically in FIG. 2 and described in what follows.

The fibres of the composite material are initially in the form of fabric. For example, it is possible to use the Nextel fabric manufactured by 3M Company (registered trademarks) with 8-Harness satin texture. The fibres of the fabric purchased by the manufacturer have an organic coating referred to as "sizing", which is applied for improving the manageability of the fibres and reduce the degradation of the fabric. To eliminate this coating, following the instructions furnished by the manufacturer, the fibres of the fabric must first of all be subjected to a thermal treatment (Block 110), which enables complete degradation and volatilization of the organic coating.

Then, the fabric is cut (Block 120) so as to obtain pieces of fabric, for example pieces having a rectangular shape in order to be able to form more easily a plurality of layers of fabric, as will be described more clearly in what follows.

The pieces of fabric cut and deprived of the organic coating are treated so as to apply homogeneously the coating made of zirconia on the surface of the fibres. In particular, the zirconia coating is applied using sol-gel technology: the pieces of fabric are immersed in a sol (Block 130), i.e., in a colloidal solution of zirconia and are extracted at a controlled rate such as to obtain a homogeneous film.

Preferably, the colloidal solution of zirconia contains: a colloidal phase obtained from metallorganic precursors of zirconia; and submicrometric powders of zirconia suspended in the colloidal phase.

After extraction from the zirconia colloidal suspension, the ceramic fibres are first dried (Block 140) in air at room temperature, and/or in a ventilated oven. Finally, a thermal treatment at high temperature is performed on the fibres thus coated (Block 150), in particular at a temperature of up to 500° C., in order to consolidate the film of zirconia and cause it to adhere firmly on the surface of the fibres.

Once application of the zirconia coating is terminated, the latter possesses a very fine polycrystalline structure, i.e., with dimensions of the crystalline grain smaller than one micron, and uniform. Having at least two different grain sizes for the particles dispersed in the sol enables a coating with a greater thickness to be obtained, for example of approximately 1 μm, as mentioned above.

The ceramic fibres thus prepared are impregnated with a suspension of ceramic powders (Block 160), in particular an aqueous suspension of alumina powders. The suspension is pourable and fluid, and is also referred to as "slurry" or "slip".

Figure 3:
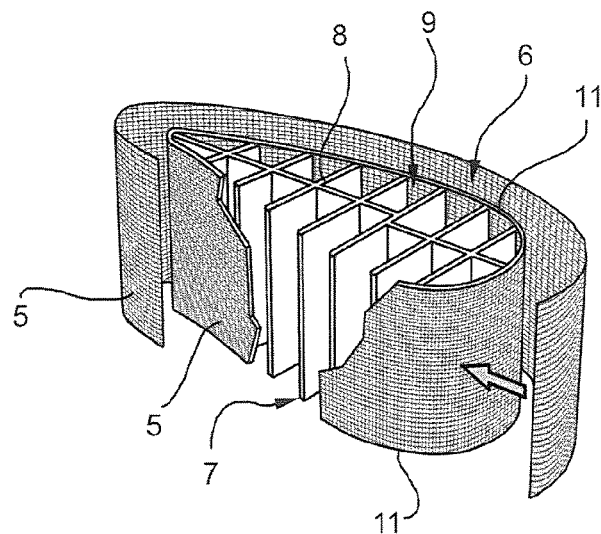
FIGS. 3 to 6 are perspective views that show some of the steps of the method of FIG. 2.

With reference to FIG. 3, the pieces of impregnated fabric are designated by the reference number 5 and are set on top of one another (Block 170 in FIG. 2) so as to form a plurality of layers and so as to obtain a preform 6, which has a shape similar to that of the finished component to be produced. To give the preform 6 the desired shape, preferably the layers of fabric 5 are set on disposable cores and/or on forming dies, having a shape that is complementary to, i.e., the negative of, the one to be obtained. The surface of the forming mould and/or of the disposable core, on which the layers of fabric 5 are set, is constituted by a non-draining material, i.e., a material that does not absorb by capillarity the liquid part of the mixture that impregnates the fibres.

The superposition of the layers of fabric 5 is carried out preferably in a manual way, but could also be automated.

According to a variant (not shown), a procedure for forming in an automated way a preform having continuous or long fibres is, for example, the technique referred to as "filament winding". In this technique, the ceramic fibres are wound around a forming spindle set in rotation, with the result of obtaining an intertwining or else a three-dimensional texture of the fibres. The cross section of the spindle can be circular or have some other shape.

The impregnation of the fibres with the suspension of ceramic powders can be carried out by dipping the fibres in the suspension before they reach the spindle, or else dipping the entire dry preform of fibres after it has been formed on the spindle.

As an alternative to the layers of fabric and to the filament-winding technique, to obtain the preform 5 it is possible to use a so-called "mat" of ceramic fibres, i.e., a mat of non-woven fibres, intertwined in a random way. Said mat is shaped in the form of the component to be made and is soaked in the suspension of ceramic powders.

In the particular example shown in FIG. 3, the pieces of fabric 5 are applied on the lateral surface 7 of a disposable core 8, the shape of which defines the negative of the cavity 3. The disposable core 8 has internal cavities 9, which are open both along the axis 2 and laterally to keep the cavities in communication with the pieces of fabric 5 set on the lateral surface 7.

Preferably, during production of the preform 6, additional layers are arranged in areas corresponding to the two axial ends of the disposable core 8 to hinder detachment of the preform 6 from such ends.

After forming, the end edges 11 of the preform 6 are trimmed (Block 180 in FIG. 2), for example manually using scissors, for removing any possible selvedges or else frayed ends that tend to form in the previous operations of cutting of the fabric and positioning of the pieces of fabric 5, and for bestowing the desired axial length upon the preform 6.

Figure 4:
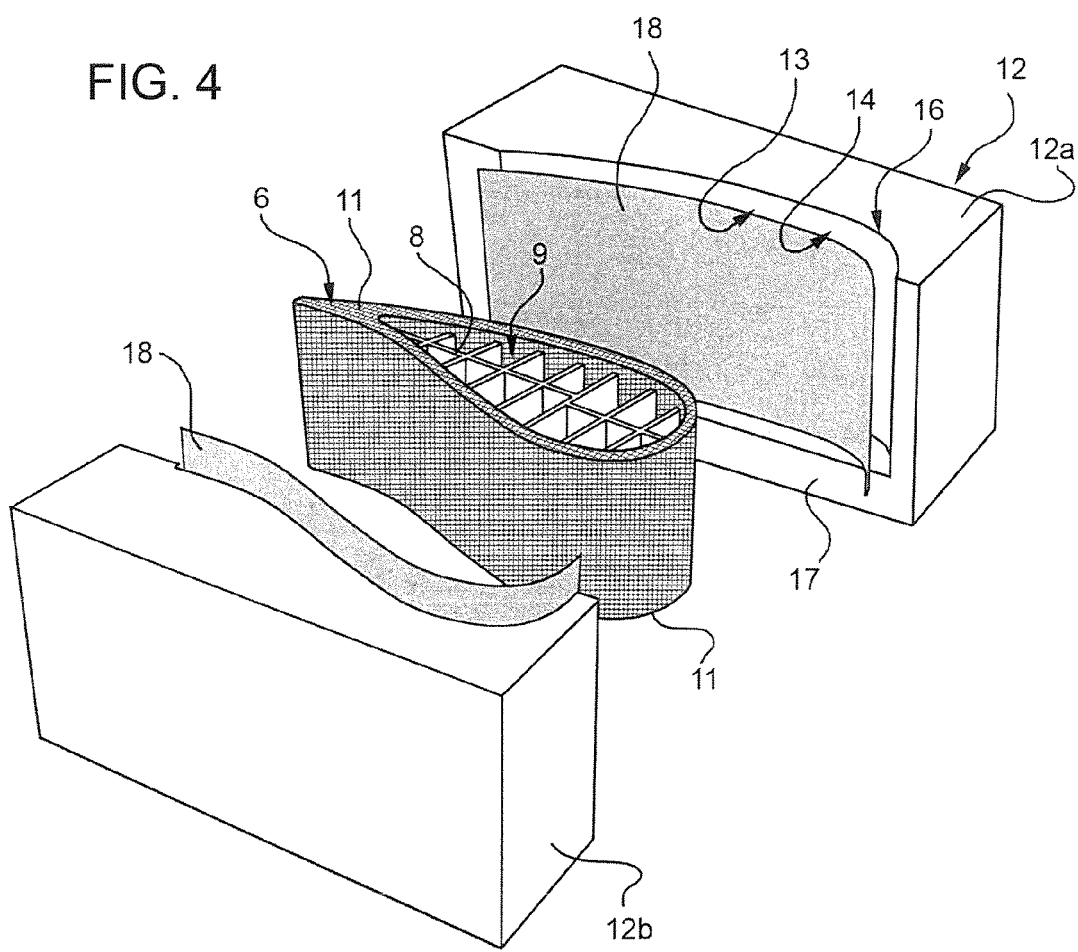

With reference to FIG. 4, the preform 6 is set in a draining mould 12, i.e., a mould capable of absorbing by capillarity the liquid part of the ceramic suspension present between the fibres (Block 190 in FIG. 2). For example, the mould 12 is a mould made of gypsum or plaster. In the particular example shown, the mould 12 is constituted by two half-moulds 12a and 12b and has a seat 13, the shape of which is substantially the negative of the external shape of the blade 1. The seat 13 is defined by a lateral surface 14 shaped according to the intrados and extrados of the blade 1, has an opening 16 at the top end, and at the bottom end is closed by a portion 17 of the half-moulds 12a and 12b.

Before or during placing of the preform 6 in the mould 12, the lateral surface 14 is coated with a film 18 of impermeable material, of a removable type. The film 18 is preferably constituted by a number of distinct pieces set alongside one another.

Figure 5:
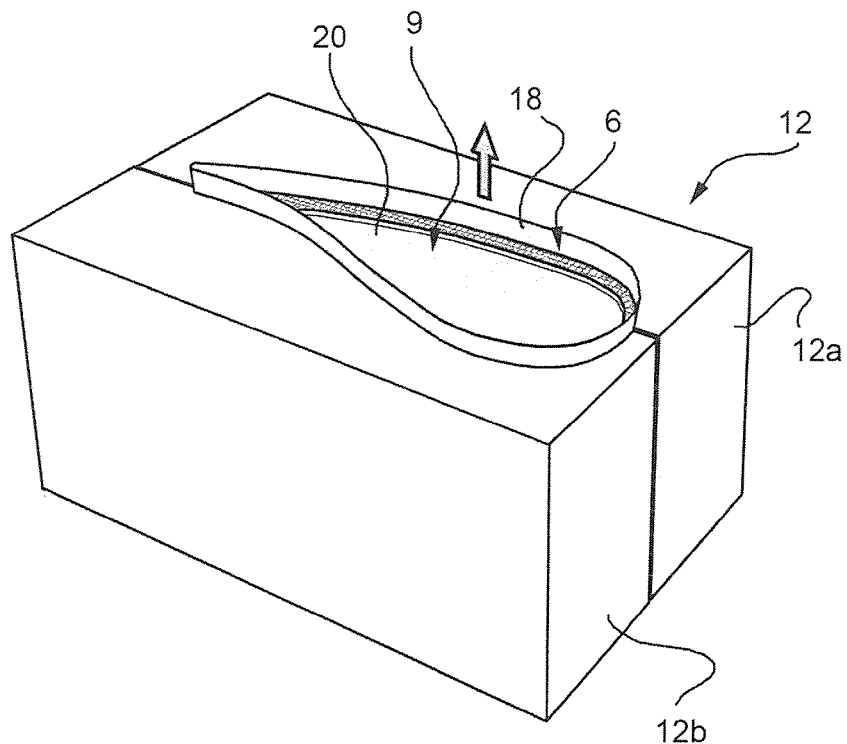

With reference to FIG. 5, once the half-moulds 12a and 12b have been closed around the preform 6, the mould 12 is set in a vertical position. The opening 16 is used for pouring into the cavities 9 an amount of suspension 20 of ceramic powders (Block 200 in FIG. 2). The ceramic material is defined, in particular, by alumina. The opening 16 is then used for removing the film 18 (Block 210), which, in particular, is slid in a direction parallel to the lateral surface 14. Only at this point does the plaster of the mould 12 start to drain the liquid part of the mixture that impregnates the preform 6 (Block 220).

At the same time, the removal of liquid caused by the draining material of the mould 12 induces the preform 6 to absorb the suspension 20, the latter being set in contact with the surface of the preform 6 that is opposite to the lateral surface 14, as if draining generated an empty space, which is progressively filled by arrival of new suspension.

Figure 6:
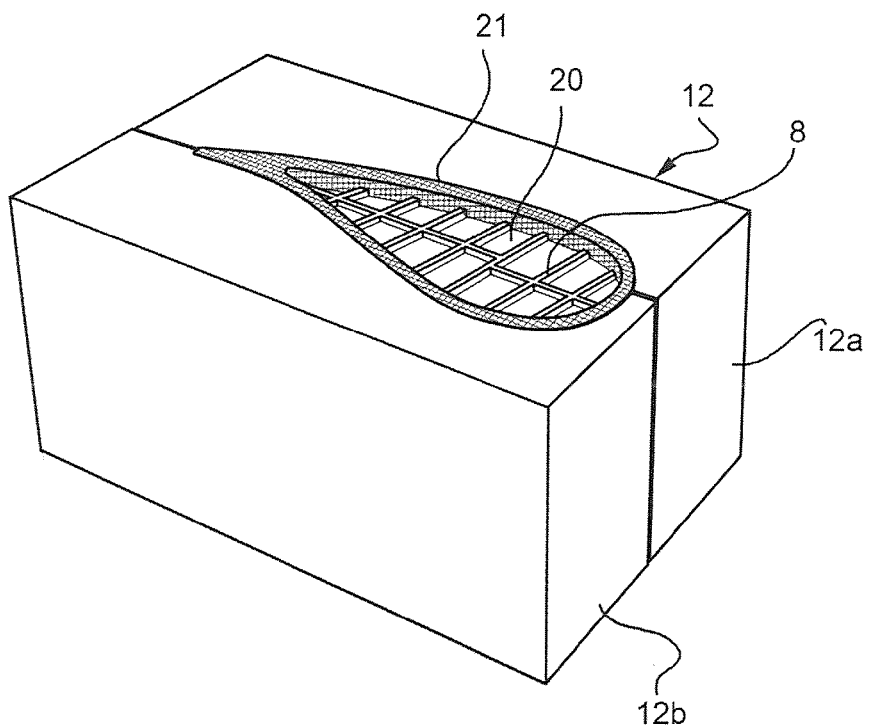

With reference to FIG. 6, the suspension 20, passing through the side openings of the disposable core 8, infiltrates between the fibres of the preform 6. Consequently, simultaneously to the draining of liquid, new ceramic material infiltrates between the fibres of the preform 6: the cavities 9 are hence a reservoir or an accumulation for the suspension 20, which is absorbed by the preform 6. During the steps of draining/infiltration, the level of the suspension 20 in the cavities 9 tends to drop so that it is progressively restored, for example manually. By keeping the cavities 9 always full, the suspension 20 is absorbed in a homogeneous way throughout the axial height of the preform 6, and not only in the bottom parts.

Thanks to the continuous draining of the liquid part, starting from the lateral surface 14, the material between the fibres of the preform 6 tends progressively to solidify and to form a porous matrix, which is more compact than that of the preform 6. The body that is being formed is referred to as "green body" and is designated by the reference number 21 in FIG. 6. Given that said matrix is porous, it in any case lets liquid pass into the mould 12.

The steps of draining/infiltration are terminated when it is detected, for example visually, that in an area corresponding to the lateral surface 7 a solid deposit starts to form, i.e., that the formation of the porous matrix of the body 21 has reached the lateral surface 7: this phenomenon indicates that the absorbing capacity of the ceramic powders of the suspension 20 is exhausted, and that consequently only liquid infiltrates into the body 21.

With reference to FIG. 2, the body 21 is removed from the mould (Block 230) by opening the half-moulds 12a and 12b, and is then dried (Block 240), leaving it in air at room temperature for 24 hours. As an alternative or in succession with respect to drying at room temperature, drying is carried out in a ventilated oven with forced circulation of air or circulation of air by natural convection.

The disposable core 8 is made of organic material so that, during the thermal treatment in air, it degrades and decomposes, and finally is eliminated thanks to the reaction of oxidation between the atmospheric oxygen and the carbon residue deriving from decomposition. Typically, said oxidation reaction is activated at temperatures higher than 400° C.

The body 21 is then sintered (Block 250) to obtain an effective cohesion between the powders of the matrix and the fibres. The temperature must be sufficiently high as to cause reaction of the ceramic powders that define the matrix between the reinforcement ceramic fibres and, at the same time, lower than the temperature in which said fibres undergo damage. In fact, the majority of the ceramic fibres (and all of the ceramic fibres with a base of polycrystalline oxides) undergo microstructural modifications at temperatures higher than approximately 1300-1350° C.: said microstructural modifications entail a significant decrease in the mechanical resistance and a high embrittlement.

Finally, if necessary, machining operations of finishing are carried out (Block 260), followed by a baking operation, which completes the consolidation obtained by sintering.

The method of the present invention is to be used in the following fields:
production of components for aerospace engines; and
production of turbine components and components of turbine systems and plants (for example, of the so-called "aero-derivative" type and for the production of electrical energy).

By way of example, these fields include, in addition to the blades already mentioned, the following components:
parts of combustors;
parts of post-burners;
parts of flame stabilizers; and
supports for sensors and thermocouples, for measurements on gases.

For each component to be made, the form of the draining mould must be determined in a specific way. The position of the surface of contact with the preform of impregnated fibres must be such as to render practically unidirectional the flow of liquid drained in the draining mould (in the example of the blade 1, said flow is radial towards the outside with respect to the axis 2). In addition, the shape of the draining mould must be preferably of an open type, to cause the suspension 20 to come into contact with the preform of impregnated fibres on a side opposite to the surface of contact with the draining mould.

According to an embodiment not shown, the preform made of ceramic fibres is obtained by setting the layers of fabric 5 on top of one another in the draining mould, resting said layers on an impermeable portion, for example a film, which is removed when draining is to be started.

The quality of the composite material made with the method described above depends also upon the characteristics of the suspension 20. In particular, the suspension 20 has a content of ceramic powders that is typically comprised between 40 vol % and 60 vol %. To obtain optimal qualities of compactness for the final composite material, the volume content of powders should be higher than 50 vol %.

In addition, it is advantageous for the suspension 20 to present not excessively high values of viscosity so that there will be no difficulty of penetration into the preform 6. The limit value of viscosity not to be exceeded is 10 Pas (Pascal× second). In particular, the suspension should not exceed the value of 2 Pas in order to present satisfactory infiltration times.

In order to achieve said result, i.e., in order to improve the fluidity and pourability of the ceramic suspension, appropriate dispersing and fluidifying agents can be used. Typical dispersing agents are those of the family of anionic polyelectrolites. These are water-soluble polymers capable of attracting and binding electrolytes in solution and consequently be electrostatically charged. The anionic polyelectrolites, by depositing on the ceramic powders, have the effect of bestowing upon the powders themselves a negative electrostatic charge, which causes mutual repulsion thereof preventing their aggregation and flocculation. An example of an effective anionic polyelectrolite dispersing agent is Dolapix 85 belonging to the family of Dolapix (registered trademark) produced by the company Serva of Heidelberg (Germany).

When choosing ceramic alumina powders, it is expedient for the degree of purity to be higher than 99%, and for the percentages of $SiO_2$ and $Na_2O$ to be extremely low in order to prevent possible creep at high temperature or degradation, at the temperatures that are present during sintering or in the conditions of operation of the component. For example, it is possible to use AES-23 alumina produced by the company Sumitomo (Japan).

In addition, the liquid of the suspension 20 is chosen so as to be compatible with the ceramic material of the powders and to obtain a homogeneous dispersion of the powders themselves. As liquid, for the powders of ceramic oxides demineralized water is preferred. In the case of use of non-oxide ceramic materials, as liquid it is possible to use organic solvents, for example alcohol, benzene, toluene, etc.

Preferably, the suspension or mixture with which the fibres that form the preform 6 are impregnated prior to the draining step is the same as the suspension 20 that is used for the step of infiltration.

As mentioned above, during sintering, the ceramic powders react so as to cause the matrix of the composite material to gain an appropriate cohesion, hardness, and mechanical resistance. At the same time, the reactivity of the powders must not be so high as to entail an excessive dimensional shrinkage. In fact, given that the fibres do not undergo contraction, a high dimensional shrinkage of the powders would lead the matrix to have residual stresses and cracks and to compress the fibres. In particular, the dimensional shrinkage of the powders during sintering must not exceed 2%. Optimal results are achieved with a dimensional shrinkage of less than 0.8%.

In particular, the ceramic powders of the suspension 20 are defined by a mixture with at least two different grain sizes, for example 1 μm and 10 μm. In particular, the granulometric distribution is of a multimodal type; i.e., the distribution around the average values of grain size has a relatively large dispersion. The mixture of powders with different grain sizes enables a better compacting or "packing" of the powders to be obtained between the fibres during the steps of draining/infiltration and the right degree of reactivity to be obtained during the subsequent sintering step. In fact, ceramic powders of larger grain size possess a greater refractivity and thermal stability, whilst finer powders react more readily to temperature, contributing to determining cohesion also of the powders of greater size. In turn, a good "packing" of the powders ensures that the composite material will possess low values of porosity and low values of dimensional shrinkage during sintering. In fact, the part of powders that has finer grain size presents a higher reactivity, due to the high contribution of free surface energy, and hence favours consolidation of the matrix during sintering; the part that has a coarser grain size, instead, functions as inhibitor.

From the foregoing it appears clearly how the method according to the present invention enables, in the fields referred to above, components made of composite material to be produced having a ceramic matrix with relatively low porosity. For example, by choosing alumina as ceramic material and water as liquid of the suspension 20, a homogeneous porosity is obtained of approximately 25%, with average pore diameters of 0.7 μm.

The procedures of infiltration of the ceramic powders in the preform are optimized. In fact, the times of the process are relatively short, above all because the majority of the ceramic powders that come to constitute the matrix of the composite are infiltrated simultaneously with drainage of liquid. By calibrating appropriately the amount of the powders and the viscosity of the suspension 20, it is possible to optimize the rate of the process in a relatively simple way, without resorting, as occurs in other methods, to reiterated cycles of infiltration and sintering.

The composite material obtained is characterized by high toughness after sintering and, hence, has the capacity of absorbing energy before failure, preventing a brittle and catastrophic failure. In particular, notwithstanding a relatively low sintering temperature for preventing degradation of the fibres (for example, a temperature of 1330° C.), it is possible to obtain a matrix with good mechanical properties (approximately 130 MPa) and with a very low dimensional shrinkage (less than 0.8%, which limits onset of residual stresses in the final composite material, also thanks to the characteristics of grain size of the powders used in the suspension 20.

Impregnation of the fibres before production of the preform 6 is relatively simple. However, it is not strictly necessary to impregnate the fibres prior to forming, but it is possible to reverse the sequence of these two steps. For example, it is possible to shape a preform of dry fibres and then set said preform in a draining mould using a removable impermeable portion (for example, the film 18), which coats the surface of the draining mould. The same suspension 20 is then poured to form a reservoir or accumulation, from which it progressively impregnates the fibres of the preform before the impermeable portion is removed, i.e., prior to start of the step of draining and, hence, of infiltration proper.

As has been mentioned above, given that the film 18 is set along the surface of contact between the preform 6 and the mould 12, it prevents the porous mould 12 from starting immediately to drain the liquid part of the mixture that impregnates the fibres of the preform. In addition, given that it has a negligible thickness, it can be readily slid out and simplifies the operations of the process. The fact then of having a draining mould of an assemblable type made up of a number of pieces renders removal of the green body 21 from the mould easy.

In addition, the use of ceramic oxides to provide all the parts of the composite prevents any sort of problem of chemical oxidation and chemical degradation at high temperature and in oxidizing environments. Zirconia and alumina are completely insoluble or non-mixable with one another in the solid state so that zirconia represents an ideal interface between the fibres and the matrix. In addition, zirconia enables a mechanical resistance to be obtained and, above all, a resistance to high-temperature oxidation that are equal to or higher than those of other ceramic materials. The sol-gel technology used for applying the coating to the fibres is more economically advantageous than other processes, such as Chemical Vapour Deposition (CVD) used for non-oxide composites.

In addition to being economically advantageous, the method described above enables production also of components with complex geometry, such as the blade 1 described above. In addition, after sintering, a product is obtained the shape and dimensions of which are extremely close to the ones of the component to be made so that it is normally not necessary to envisage an oversizing prior to sintering, and just a finishing operation is sufficient to obtain the final component. Furthermore, the sintered product can be machined with machine tools, using machining tools and in water bath, so that it is also suited to be modified if need be.

Finally, it is clear that modifications and variations may be made to the method described herein with reference to the attached figures, without thereby departing from the sphere of protection of the present invention, as defined in the annexed claims.

For example, the draining mould could coincide with a core on which the preform is set, and the suspension 20 could, instead, be set all around the preform so as to produce a radial direction of flow towards the inside with respect to the axis 2. In addition, the suspension 20 could present a hydrostatic head above the preform or else could undergo a compression so as to be forced to penetrate into the preform simultaneously with draining. In order to decide the end of the steps of draining/infiltration, indicators could be used that are different from the solid deposits in the cavities, for example, the duration of said steps could be pre-determined.

The preform could be formed by fibres of the so-called "chopped" type, or else by mats of long non-woven fibres, randomly intertwined, as already mentioned above, or else by a single piece of fabric wound and/or folded to form layers set on top of one another.

The impermeable portion that can be removed from the draining mould could be different from the film 18.

Finally, the draining mould could be made of a draining or porous material different from plaster.

The invention claimed is:

1. A method for the production of a component of ceramic-matrix composite material, the method comprising:
    (a) preparing a preform of ceramic fibers set in a draining mold by a plurality of steps selected from the group consisting of (i) first shaping the preform of ceramic fibers, then setting the preform in the draining mold and then impregnating the ceramic fibers with a first suspension of ceramic powders, wherein the impregnating of the ceramic fibers is done without draining liquid from the preform, (ii) first impregnating the ceramic fibers with the first suspension of ceramic powders, then shaping the preform and then setting the preform in the draining mold, and (iii) first shaping the preform of ceramic fibers, then impregnating the preform with the first suspension of ceramic powders and then setting the preform in the draining mold, wherein in (i), (ii) and (iii) the first suspension comprises a liquid that, after impregnation of the ceramic fibers, is present between fibers of the preform and wherein said impregnated preform comprises a material of an initial compactness;
    (b) then, continuously draining by capillarity the liquid that is present between the impregnated fibers of the preform while simultaneously causing a second suspension of ceramic powder to be infiltrated between the fibers of the preform to cause the material progressively to solidify and to form a green body comprising material that is more compact than the material initially;
    (c) removing the green body from the draining mold; and
    (d) sintering the green body to form the component of ceramic-matrix composite material.

2. The method according to claim 1, wherein the infiltration of the second suspension is induced by draining.

3. The method according to claim 2, comprising the step of forming an accumulation of said second suspension on a surface of the preform that is opposite to a surface of contact between said draining mold and said preform.

4. The method according to claim 3, wherein said accumulation is formed by pouring said second suspension into a cavity through a top opening of said draining mold.

5. The method according to claim 4, wherein said cavity is obtained in an intermediate position in said preform.

6. The method according to claim 3, wherein said step of infiltration is terminated when a solid deposit is formed in said accumulation.

7. The method according to claim 1, comprising the steps of providing an impermeable portion along a surface of contact between said draining mold and said preform, and removing said impermeable portion to start said draining step.

8. The method according to claim 7, wherein said impermeable portion is a film that, in order to be removed, is slid in a direction parallel to said surface of contact.

9. The method according to claim 7, wherein said preform is shaped on a disposable core and/or on a forming mold defined by said draining mold and provided with said impermeable portion for resting the fibers of said preform.

10. The method according to claim 1, comprising providing a coating made of ceramic material on said fibers, wherein the ceramic materials of said fibers, of the powders of said first and second suspensions, and of said coating are ceramic oxides; the ceramic oxides of the powders and of said coating being insoluble with one another in the solid state.

11. The method according to claim 10, wherein the ceramic oxide of said fibers and of the powders of said first and second suspensions is alumina, and the ceramic oxide of said coating is zirconia.

12. The method according to claim 10, wherein said coating is applied on said fibers using sol-gel technology.

13. The method according to claim 12, wherein the sol comprises particles having at least two different grain sizes.

14. The method according to claim 1, wherein said preform is shaped by setting layers of fabric on top of one another.

15. The method according to claim 1, wherein said preform is shaped by interweaving the ceramic fibers via filament winding.

16. The method according to claim 1, wherein said preform comprises a mat of non-woven fibers, which is shaped in the form of the component to be made.

17. The method according to claim 1, wherein said draining mold comprises at least two assembled pieces, and said body is removed from said draining mould by opening said pieces.

18. The method according to claim 1, wherein said second suspension comprises a mixture of ceramic powders with at least two different grain sizes.

19. The method according to claim 1, wherein said second suspension has a content of powders comprised between 40 and 60 vol %.

20. The method according to claim 1, wherein said second suspension has a viscosity of less than 10 Pas.

21. The method according to claim 1, wherein said second suspension has a granulometric distribution of the powders that is of a multimodal type.

22. The method according to claim 1, comprising preparing the preform of ceramic fibers set in the draining mold, as provided in step (a), by first shaping the preform of ceramic fibers, then setting the preform in the draining mold and then impregnating the ceramic fibers with the first suspension of ceramic powders, wherein the impregnating of the ceramic fibers is done without draining liquid from the preform.

23. The method according to claim 1, comprising preparing the preform of ceramic fibers set in the draining mold, as provided in step (a), by first impregnating the ceramic fibers with the first suspension of ceramic powders, then shaping the preform and then setting the preform in the draining mold.

24. The method according to claim 1, comprising preparing the preform of ceramic fibers set in the draining mold, as provided in step (a), by first shaping the preform of ceramic fibers, then impregnating the preform with the first suspension of ceramic powders and then setting the preform in the draining mold.

25. The method according to claim 1, wherein the component is made without a repeated cycle of infiltration and sintering.

26. The method according to claim 1, wherein the first suspension and the second suspension are the same.

27. The method according to claim 1, comprising introducing an initial amount of the second suspension into the draining mold before the draining in step (b) and introducing an additional amount of the second suspension into the draining mold during the draining and infiltration in step (b).

28. A method for the production of a component of ceramic-matrix composite material, the method comprising the steps of:
(a) providing a preform of ceramic fibers set in a draining mold, said ceramic fibers comprising an initial amount of a suspension of ceramic powder impregnated therein with the suspension comprising a liquid that is present between fibers of the preform, said impregnated preform comprising material of an initial compactness;
(b) then, continuously draining by capillarity the liquid that is present between the impregnated fibers of the preform while simultaneously causing an additional amount of the suspension to be infiltrated between the fibers of the preform to cause the material progressively to solidify and to form a green body comprising material that is more compact than the material initially;
(c) removing the green body from the draining mold; and
(d) sintering the green body to form the component of ceramic-matrix composite material.

* * * * *